(12) United States Patent
Kang et al.

(10) Patent No.: US 9,015,607 B2
(45) Date of Patent: Apr. 21, 2015

(54) VIRTUAL SPACE PROVIDING APPARATUS AND METHOD

(75) Inventors: Hyun Joo Kang, Suwon-si (KR); Young Ho Rhee, Yongin-si (KR); Yeo Jin Kim, Suwon-si (KR); Il Ku Chang, Seoul (KR); Ju Youn Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 485 days.

(21) Appl. No.: 12/769,875

(22) Filed: Apr. 29, 2010

(65) Prior Publication Data

US 2011/0161838 A1    Jun. 30, 2011

(30) Foreign Application Priority Data

Dec. 28, 2009  (KR) .................. 10-2009-0131588

(51) Int. Cl.
*G06F 3/048*   (2013.01)
*G06F 3/00*    (2006.01)
*G06F 15/16*   (2006.01)
*G06Q 10/06*   (2012.01)
*G06Q 50/00*   (2012.01)

(52) U.S. Cl.
CPC .............. *G06Q 10/06* (2013.01); *G06Q 50/01* (2013.01)

(58) Field of Classification Search
CPC ............. G06F 3/04815; G06F 3/0481; G06F 17/30867; H04L 12/1813; H04L 12/1822; H04L 12/2496; H04L 12/581; H04L 41/026; H04L 41/5093

USPC ......... 715/757, 706, 753, 758, 765, 826, 850; 707/204; 704/204, 205

See application file for complete search history.

(56) References Cited

U.S. PATENT DOCUMENTS

| | | | |
|---|---|---|---|
| 2005/0080866 A1* | 4/2005 | Kent et al. ............... | 709/207 |
| 2007/0162566 A1* | 7/2007 | Desai et al. ............. | 709/219 |
| 2008/0209351 A1* | 8/2008 | Macadaan et al. ....... | 715/762 |
| 2009/0063178 A1* | 3/2009 | Pousti et al. ............. | 705/1 |
| 2009/0158214 A1* | 6/2009 | Arnold et al. ............ | 715/830 |
| 2009/0299960 A1* | 12/2009 | Lineberger ............... | 707/3 |
| 2010/0222645 A1* | 9/2010 | Nadler et al. ............. | 600/300 |
| 2011/0154208 A1* | 6/2011 | Horii ....................... | 715/736 |

FOREIGN PATENT DOCUMENTS

| | | | |
|---|---|---|---|
| JP | 2009-087154 | * | 4/2009 |
| KR | 10-2009-0022375 | | 3/2009 |
| KR | 10-2009-0029672 | | 3/2009 |
| KR | 10-2009-0046364 | | 5/2009 |

* cited by examiner

Primary Examiner — Boris Pesin
Assistant Examiner — Rinna Yi
(74) Attorney, Agent, or Firm — NSIP Law

(57) ABSTRACT

Provided is an apparatus and method for providing a virtual space associated with a user. The apparatus may include a storage to store context information of the user of the virtual space, and a controller to provide, to another user, the virtual space transformed based on the context information of the user when the other user visits the virtual space of the user. The context information may include at least one of a connection time when the user connects to the virtual space, a location of the user during the connection time, a current emotion of the user as determined by the user, and a current status of the user as determined by the user.

16 Claims, 5 Drawing Sheets

VIRTUAL SPACE PROVIDING APPARATUS AND METHOD

CROSS-REFERENCE TO RELATED APPLICATION(S)

This application claims the benefit under 35 U.S.C. §119 (a) of Korean Patent Application No. 10-2009-0131588, filed on Dec. 28, 2009, in the Korean Intellectual Property Office, the entire disclosure of which is incorporated herein by reference for all purposes.

BACKGROUND

1. Field

The following description relates to a virtual space providing apparatus and method, and more particularly, to an apparatus and method for providing a virtual space associated with a user.

2. Description of Related Art

With the popularization of the Internet, users may create their own personal websites or personal blogs on the Internet to interact with others. Also, along with the emergence of a variety of tools using the Internet, communications over the Internet have been activated.

As described above, services enabling social networking using the Internet may be referred to as a Social Network Service (SNS). In a case of web-based SNS, when other users visit a homepage associated with a specific user, information about the specific user (for example, name, age, gender, presence etc.), contents uploaded by the specific user for the purpose of sharing information, and the like may be provided.

SUMMARY

In one general aspect, an apparatus for providing a virtual space associated with a user includes a controller to display, on the virtual space, a connection time when a user connects to the virtual space, and to display, on the virtual space, information about contents in association with the connection time, the contents being provided to the user in the virtual space during the connection time.

The virtual space may include a time band, and the connection time may be displayed in association with the time band.

The controller may display a location of the user at the connection time, in association with the connection time.

In another general aspect, an apparatus for providing a virtual space associated with a user includes a storage to store context information of the user of the virtual space; and a controller to provide, to another user, the virtual space transformed based on the context information of the user when the other user visits the virtual space of the user.

The context information may include at least one of a connection time when the user connects to the virtual space, a location of the user during the connection time, a current emotion of the user as determined by the user, and a current status of the user as determined by the user.

The controller may provide, to the other user, the virtual space transformed based on the context information of the user, and preference information of the other user when the other user visits the virtual space of the user.

The preference information may be either information about a consumption frequency of contents consumed by the other user or wish list information about contents desired to be consumed by the other user. The wish list information may be inputted by the other user.

The controller may select contents matching the context information based on metadata of each of a plurality of contents, and provide, to the user, information about the selected contents when the user visits the virtual space.

The storage may store preference information extracted from an interaction between the user and the virtual space for a predetermined past period of time, and the controller may select contents corresponding to the preference information referring to metadata of each of a plurality of contents, and provide, to the user, information about the selected contents when the user visits the virtual space.

The storage may store preference information extracted from an interaction between the user and the virtual space for a predetermined past period of time, and the controller may provide, to another user, the virtual space transformed based on the context information of the user and the preference information when the other user visits the virtual space of the user.

The controller may receive context information or preference information associated with the other user visiting the virtual space, and re-transform the transformed virtual space based on context information or preference information of the other user to provide the re-transformed virtual space to the other user.

In still another general aspect, an apparatus for providing a virtual space associated with a user includes a storage to store first information associated with the user of the virtual space and second information associated with another user; and a controller to generate the virtual space based on the first information of the user, to customize the virtual space when the other user visits the virtual space of the user by transforming the virtual space based on the second information, and to provide, to the other user, the customized virtual space.

In another general aspect, a method of providing a virtual space associated with a user includes: displaying, on the virtual space, a connection time when a user connects to the virtual space, and displaying, on the virtual space, information about contents in association with the connection time, the contents being provided to the user in the virtual space during the connection time.

The virtual space may include a time band, and the connection time may be displayed in association with the time band. The method may further include displaying a location of the user at the connection time, in association with the connection time.

In another general aspect, a method of providing a virtual space associated with a user includes: storing context information of the user of the virtual space, and providing, to another user, the virtual space transformed based on the context information of the user when the other user visits the virtual space of the user.

The context information may include at least one of: a connection time when the user connects to the virtual space, a location of the user during the connection time, a current emotion of the user as determined by the user, and a current status of the user as determined by the user. The method may further include providing, to the other user, the virtual space transformed based on the context information of the user and preference information of the other user when the other user visits the virtual space of the user. The preference information may include at least one of: information about a consumption frequency of contents consumed by the other user, and wish list information about contents desired to be consumed by the other user, the wish list information being inputted by the other user. The method may further include: selecting contents matching the context information based on metadata of each of a plurality of contents, and providing, to the user, information about the selected contents when the user visits the virtual space. The method may further include: storing preference information extracted from an interaction between the user and the virtual space for a predetermined past period of time, selecting contents corresponding to the preference information referring to metadata of each of a plurality of contents, and providing, to the user, information about the selected contents when the user visits the virtual space.

In another general aspect, a method for providing a virtual space associated with a user includes: storing first information associated with the user of the virtual space, and second information associated with another user, generating the virtual space based on the first information of the user, to customize the virtual space when the other user visits the virtual space of the user by transforming the virtual space based on the second information, and providing, to the other user, the customized virtual space.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

Figure 1:
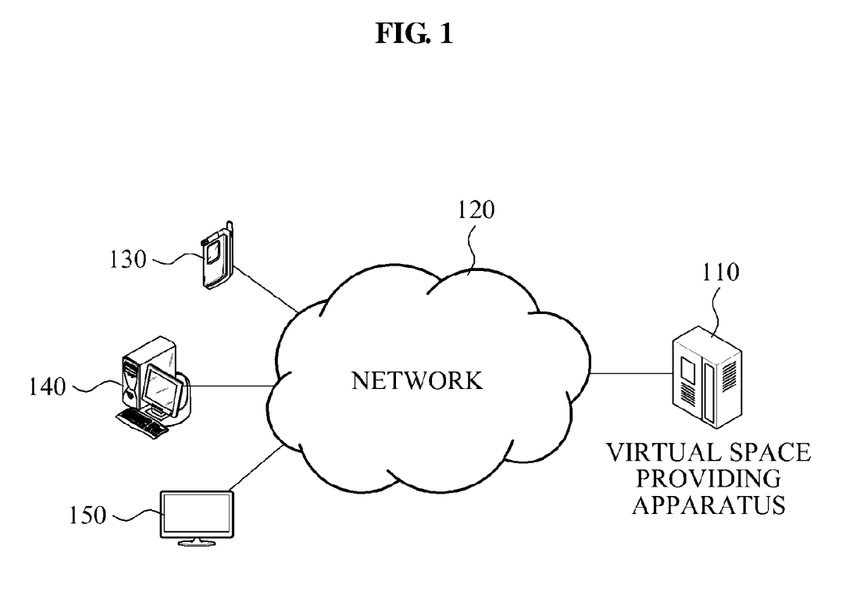
FIG. 1 is a diagram illustrating a network connection between an apparatus for providing a virtual space according to an embodiment, a Personal Computer (PC) of a user associated with the virtual space providing apparatus, and PCs of other users visiting the virtual space.

FIG. 1 is a diagram illustrating a network connection between an apparatus 110 for providing a virtual space (hereinafter, referred to as "virtual space providing apparatus") according to an embodiment, a Personal Computer (PC) of a user associated with the virtual space providing apparatus, and PCs of other users visiting the virtual space.

A user may connect to the virtual space providing apparatus 110 through a network 120 using a terminal 140 of the user (for example, Personal Computer (PC)). For example, the network 120 may be the Internet.

The virtual space providing apparatus 110 may provide a virtual space associated with the user. The virtual space may be a personal homepage of the user, a blog page of the user, a profile page associated with the user in a social network service (SNS), a space associated with the user on a program used through a network (for example, a house of the user in Second Life® of a virtual space developed by Linden Lab®), and the like. The virtual space providing apparatus 110 may provide a virtual space associated with each of a plurality of users as well as a virtual space associated with a specific user.

In a virtual space associated with a user first connecting to the virtual space providing apparatus 110, popular contents of an area associated with the user may be provided. The virtual space providing apparatus 110 may extract the popular contents from contents consumed by a plurality of users included in the same area as that of the user while connecting to the virtual space providing apparatus 110.

By connecting to the virtual space providing apparatus 110 via the network 120 using terminals 130 and 150 of other users, the other users may visit the virtual space associated with the user. As the terminals of the other users, PC, notebook computers, personal digital assistant (PDA), mobile phones, smart phones, televisions (TV), and the like may be used.

Figure 2:
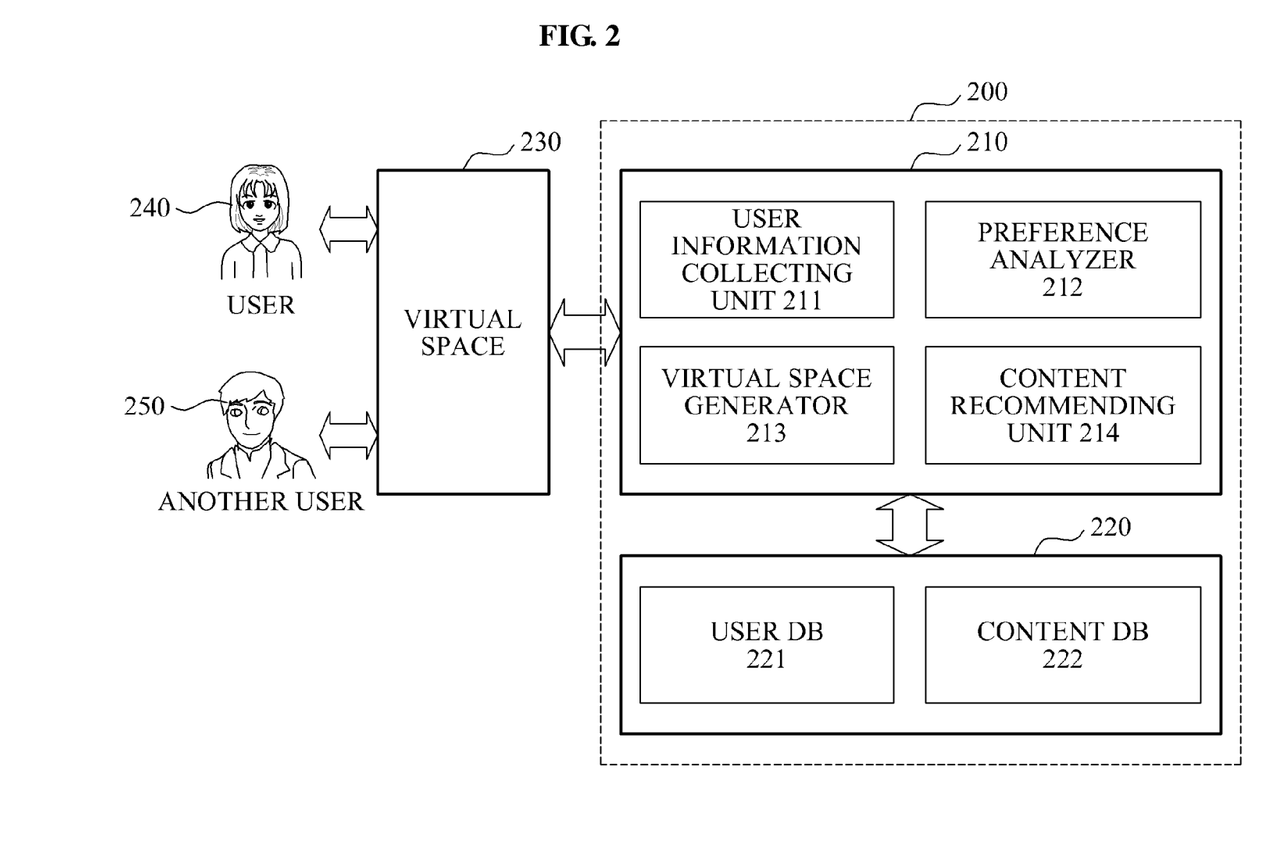
FIG. 2 is a block diagram illustrating an apparatus for providing a virtual space according to another embodiment.

FIG. 2 is a block diagram illustrating an apparatus for providing a virtual space 200 (hereinafter, referred to as "virtual space providing apparatus") according to another embodiment.

The virtual space providing apparatus 200 includes a controller 210 and a storage 220. The virtual space providing apparatus 200 may provide a virtual space 230 associated with a user 240. The user 240 may edit the virtual space 230 associated with the user 240, using the virtual space providing apparatus 200. The user 240 may upload one's favorite pictures to the virtual space 230, or create a message and the like on a notice board provided in the virtual space 230.

The storage 220 may include a user database (DB) 221 and/or a content DB 222. The user DB 221 may store a user profile, context information of the user 240 associated with the virtual space, and the like.

The user profile may include a name, an age, a gender, etc. of the user 240.

The context information may be information about the past, present, and/or future context of the user 240.

The context information may be a time when the user 240 associated with the virtual space 230 connects to the virtual space 230, or a time when the user 240 performs actions in the virtual space 230. For example, when the user 240 connects to the virtual space 230 at 2 p.m. Apr. 3, 2009, and at 7 p.m. of Apr. 8, 2009, the times of 2 p.m. and 7 p.m. may be stored in the user DB 221. Also, when the user 240 replays a moving picture A in the virtual space 230 at 8 p.m. May 4, 2009, the time of 8 p.m. and an action performed by the user 240, such as replaying the moving picture A, at the time of 8 p.m. may be stored in the user DB 221. The virtual space providing apparatus 200 may include an internal clock (not illustrated), and obtain the time when the user 240 connects to the virtual space 230 and the time when the user 240 performs the action, using the internal clock. Also, the user may change a time zone of the time being stored and/or displayed, using a user interface.

The context information may be a physical location of the user 240 when the user 240 connects to the virtual space 230. For example, when the user 240 connects to the virtual space 230 at 8 p.m. May 4, 2009, while staying in London, the time, that is, 8 p.m. May 4, 2009, and a location where the user 240 is staying at that time, that is, London may be stored in the user DB 221. According to an embodiment, whenever the user 240 connects to the virtual space 230, or whenever a physical location of the user 240 is changed, the user 240 may input one's physical location in the virtual space providing apparatus 200, so that the virtual space providing apparatus 200 may verify the location of the user 240. According to another embodiment, a terminal of the user 240 used to connect to the virtual space providing apparatus 200 may verify its own location to provide the verified location to the virtual space providing apparatus 200. For example, when the terminal of the user 240 is a mobile phone or a terminal where a global positioning system (GPS) is mounted, the terminal may verify its own location, and provide the verified location to the virtual space providing apparatus 200.

The context information may be a current emotion of the user 240 determined by the user 240 (for example, bored, excited, etc.). The context information may be an emotion of the user 240 when the user 240 connects to the virtual space 230. For example, the virtual space providing apparatus 200 may enable the user 240 to input one's own emotion using the user interface, and store the inputted emotion in the user DB 221. The user DB 221 may store a current emotion status and/or a past emotion status of the user 240. When the past emotion status of the user is stored in the user DB 221, a time when the user inputs the past emotion status may also be stored.

The context information may be a current status of the user 240 determined by the user 240. The current status may include presence information about whether the user 240 is currently connected to the virtual space providing apparatus 200, information about whether the user 240 is alone in the virtual space, and the like. The virtual space providing apparatus 200 may determine the presence information, and store the determined presence information in the user DB 221. Alternatively, the user 240 may input information about one's own current status in the virtual space providing apparatus 200.

The context information may be a behavior or action performed in the virtual space 230 by the user 240. For example, when the user 240 replays and watches the moving picture A in the virtual space 230 at 8 p.m. May 4, 2009, the time of 8 p.m. and an action performed by the user 240 at that time, that is, replaying and watching the moving picture A may be stored in the user DB 221.

The context information may be a weather in the location of the user 240, that is, a weather where the user 240 is located at the time when the user 240 connects to the virtual space 230. The weather may be inputted by the user 240, or may be automatically received in such a manner that the virtual information providing apparatus 200 connects to a server providing weather information.

The context information may be information about a social relationship of the user 240. For example, the information about the social relationship may be information about other users whom the user 240 is acquainted with, via the virtual space 240.

The user DB 221 may further store preference information of the user. The preference information of the user may include preference information of the user 240 associated with the virtual space 230. A preference analyzer 212 may extract the preference information from an interaction between the user 240 and the virtual space 230 during a predetermined past period of time, and store the extracted preference information in the user DB 221. Also, the preference information of the user may include preference information of another user 250 who visits the virtual space 230. The preference information may be directly inputted by the user 240 and/or the other user 250.

The preference information may be wish list information about contents inputted and desired to be consumed by the users 240 and 250. For example, desiring to consume contents A and B, the user 240 may input information about the contents A and B through a user interface of the virtual space 230. Next, the contents A and B may be stored in the user DB 221, as the wish list information of the user 240.

The content DB 222 may store contents. When the user 240 uploads one's favorite pictures on the virtual space 230, the pictures may be stored in the content DB 222.

Also, the content DB 222 may store, as metadata, information about attributes of the contents in association with the contents. The information about attributes may include a type of the contents (for example, movies, pictures, music, etc.), a genre (for example, drama, action, science fiction (SF), etc.), a title, a category, an artist, an author, and the like of the contents. The information about attributes may include abstract information about the contents. For example, in a case of the contents being documentary moving pictures concerning a climate change due to global warming, the information about attributes may include "global warming" and "climate change." Also, in a case of the contents being a movie, the information about attributes may include a name of an actor, a name of a director, etc., of the movie.

Also, the content DB 222 may store a consumption log of the stored contents. Specifically, the content DB 222 may store, as the consumption log, a user consuming each of the contents, a time when the contents are consumed, a location of the user when the contents are consumed, and the like. A content recommending unit 214 may extract popular contents of each area based on the consumption log. For example, when the user 240 replays and watches the moving picture A in the virtual space 230 at 8 p.m. May 4, 2009, the user consuming the moving picture A, a time when the user 240 replays and watches the moving picture A, and a location of the user when the user 240 replays and watches the moving picture A may be stored in the content DB 222. The virtual space providing apparatus 200 may include an internal clock (not illustrated), and a time when the user 240 consumes the contents may be obtained using the internal clock.

Also, the content DB 222 may further store a profile of the user providing the stored contents, a time and location when the stored contents are provided, and the like. Also, the provided time may be a time when the user 240 connects to the virtual space 230 or/and a time when the user 240 performs an action in the virtual space 230.

The controller 210 includes a user information collecting unit 211, a preference analyzer 212, a virtual space generator 213, and/or a content recommendation unit 214.

The user information collecting unit 211 may collect information about the user 240 associated with the virtual space 230. The user information collecting unit 213 may collect logs of the user 240 to store the collected logs in the user DB 221. Also, the user information collecting unit 213 may analyze a use pattern and the like of the user 240. For example, the use pattern such as the user 240 does not watch movies on weekdays, and watches movies during weekends may be analyzed. The user information collecting unit 211 may obtain the use pattern by analyzing contents consumed in the virtual space 230.

The preference analyzer 212 may extract preference information of the user 240 associated with the virtual space 230 and/or preference information of the other user 250 that visits the virtual space 230, and store the extracted preference information in the user DB 221. The preference analyzer 212 may extract the preference information from an interaction between the user 240 and the virtual space 230 during a predetermined past period of time. For example, the preference analyzer 212 may extract a frequency of which contents are consumed (opened) by connecting to the virtual space 230 associated with the user 240 for the predetermined past period of time (for example, one month), and store the extract frequency in the user DB 221. For example, as for the frequencies of which the contents are consumed, in the case the user 240 replays a movie A fifteen times, that is, the largest number, and views a picture B ten times, the second largest number, in one month, the preference analyzer 212 may store, in the user DB 221, a pair of consumption frequencies of contents such as (movie A, 15) and (picture B, 10) as the preference information of the user 240. Also, depending on the frequency of which the contents are consumed (opened) by connecting to the virtual space 230 by the user 240 during the predetermined past period of time, the contents may be rated, and the preference information may be stored in the user DB 221.

Also, the preference analyzer 212 may analyze an attribute of contents consumed (opened) by connecting to the virtual space 230 by the user 240, so that the preference information of the user 240 may be more accurately extracted. The content DB 222 may store, as metadata, information about the attributes of the contents in association with the contents. The information about the attributes of the contents may include a type of the contents (for example, a movie, pictures, music, etc.), a genre (for example, drama, action, SF, etc.), a title, a category, an artist, an author, and the like of the contents. Also, the information about attributes may include abstract information about the contents. For example, in a case of the contents being a documentary movie concerning a climate change due to global warming, the information about attributes may include "global warming" and "climate change." Also, in a case of the contents being a movie, the information about attributes may include a name of an actor, a name of a director, and the like, of the movie.

Accordingly, the preference analyzer 212 may analyze information about the attribute of contents consumed (opened) by connecting to the virtual space 230 by the user 240 during a predetermined past period of time, so that more accurate preference information may be extracted. For example, the preference analyzer 212 may analyze a type of the contents (opened) by connecting to the virtual space 230 by the user 240 during a predetermined past period of time, and determine a type of the contents the user 240 prefers. Specifically, when about half of contents consumed by the user 240 for a past one month are music contents, it may be determined the user 240 prefers music.

The preference information of the other user 250 that visits the virtual space 230 may be extracted in a similar manner as the above.

When the preference analyzer 212 automatically analyzes the preference information, no preference information may be provided to a user who first connects to the virtual space providing apparatus 200. Along with an increase in a number of times the user uses services of the virtual space providing apparatus 200, the preference information of the user may be more accurately analyzed, and contents suitable for the user may be automatically provided.

The virtual space generator 213 may provide, to the other user 250, the virtual space 230 transformed based on the context information of the user 240 when the user 240 or the other user 250 visits the virtual space 230 associated with the user 240. The virtual space generator 213 may compare the context information of the user 240 and metadata of the contents stored in the content DB 222, and select contents suitable for the user to provide the selected contents to the virtual space 230. For example, in a case where the user 240 is staying in Paris in a previous connection to the virtual space 230 and is staying in London in a current connection to the virtual space 230, the virtual space generator 213 may provide, to the virtual space 230, popular contents that are popular with other users staying in London from among contents concerning London. Therefore, when the user 240 that has moved from Paris to London visits the virtual space 230, the popular contents concerning London may be displayed in the virtual space 230, as recommended contents.

When the other user 250 visits the virtual space 230 of the user 240, the virtual space generator 213 may provide, to the other user 250, the virtual space 230 transformed based on the context information and preference information of the user 250. For example, the other user 250, that is, an acquaintance of the user 240 visits the virtual space 230 of the user 240, that is, a home page, transformed based on the context information of the user 240 and preference information of the other user 250. Specifically, even though the other user 250 visits the virtual space 230 of the user 240, the home page 230 having different contents for different preference information of different users may be provided. When a user A preferring sports visits the home page 230 of the user 240, based on preference information of the user A, contents that are currently consumed by the user 240 concerning the sports may be provided in the home page 230. When a user B preferring music visits the home page 230 of the user 240, based on preference information of the user B, contents that are currently consumed by the user 240 concerning the music may be provided in the home page 230. In this manner, the user 240 and the other user 250 may share a variety of contents based on their individual preference information, and a relationship between the user and the other user 250 may be enhanced. Also, the user 240 may have a more intimate feeling with the other user 250 through the SNS of the present embodiment.

Also, the context information of the user 240 (for example, a location where the user 240 is staying, whether the user is present in the virtual space, and the like) may be provided. For example, when a location where the user 240 is currently staying is London, and information about the location is stored in the user DB 221 as the context information of the user 240, the information about the location of the user 240 may be displayed on the virtual space 230 at a time of connection to the virtual space 230. Also, various information concerning the location of the user 240, such as information about a peripheral area status of the location of the user 240 as well as the information about the location of the user 240, may be provided on the virtual space 230. In this manner, the other user 250 may acquire the various information.

According to another embodiment, when the other user 250 visits the virtual space 230 of the user 240, the virtual space generator 213 may provide, to the other user 250, the virtual space 230 transformed based on the context information preference information of the user 240.

According to still another embodiment, the virtual space generator 213 may receive context information or preference information associated with the other user 250 visiting the virtual space 230, and may re-transform the virtual space 230 transformed based on the context information and preference information of the user 240, based on the context information or preference information of the user 250 to provide the re-transformed virtual space 230 to the other user 250.

The content recommending unit 214 may recommend contents to the user 240 or the other user 250 based on the preference information of the user 240, when the user 240 associated with the virtual space 230 visits the virtual space 230. For example, when it is determined the user 240 prefers music based on the preference information stored in the user DB 221, the content recommending unit 214 may recommend currently popular music to the user 240 when the user 240 visits the virtual space 230.

Alternatively, the content recommending unit may recommend contents to the other user 250 based on the preference information of the other user 250 when the other user 250 visits the virtual space 230. For example, when it is determined the other user 250 prefers movies based on the preference information stored in the user DB 221, the content recommending unit 214 may recommend a currently popular movie to the other user 250 when the other user visits the virtual space 230.

The content recommending unit 214 may select contents corresponding to the context information of the user 240 based on metadata of each of a plurality of contents stored in the content DB 222, and provide, to the user 240, information about the selected contents when the user 240 visits the virtual space 230.

The content recommending unit 214 may compare the context information of the user 240 and metadata of the contents stored in the content DB 222, and select contents suitable for the user 240 to recommend the selected contents to the user 240. For example, when the user 240 stays in London, the content recommending unit 214 may recommend, to the user 240, contents that are popular with other users staying in London. For example, when the user 240 that has moved from Paris to London visits one's own virtual space 230, the popular contents concerning London may be displayed on the virtual space 230 as recommended contents.

The content recommending unit 214 may select contents corresponding to the context information of the other user 250 visiting the virtual space 230, based on metadata of each of the plurality of contents stored in the content DB 222, and provide, to the other user 250, information about the selected contents when the other user 250 visits the virtual space 230.

When the user first connects to the virtual space providing apparatus 200, preference information concerning the user may not exist. In this case, the content recommending unit 214 may extract popular contents from among contents that are consumed by a plurality of users included in the same area as that of the user while connecting to the virtual space providing apparatus 200. Information about locations of the users connecting to the virtual space providing apparatus 200 and information about the contents consumed by the users may be stored in the user DB 221. The content recommending unit 214 may provide, to the virtual space associated with the user first connecting to the virtual space providing apparatus 200, popular contents of an area associated with the user.

Figure 3:
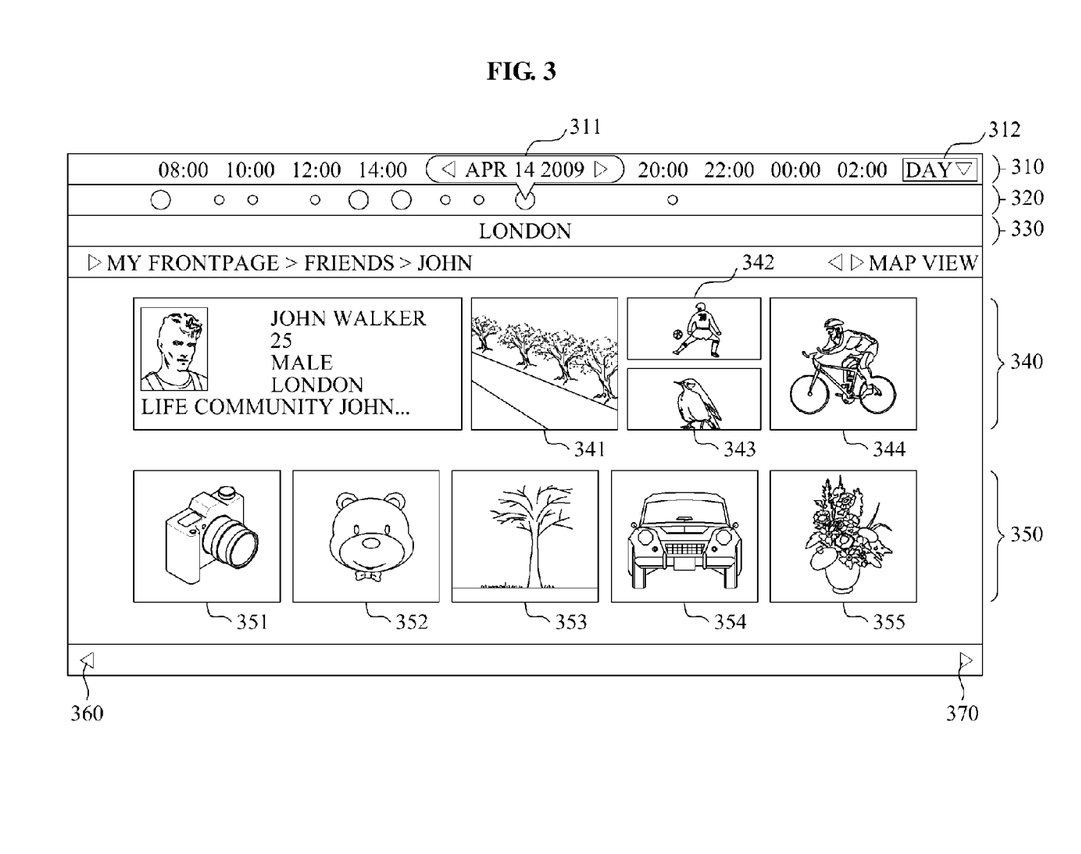
FIG. 3 illustrates an example of a virtual space provided to a user according to still another embodiment.

FIG. 3 illustrates an example of a virtual space provided to a user according to still another embodiment.

Timeline regions 310, 320, and 330 may signify a connection time when a user associated with a virtual space 300 connects to the virtual space 300 and a physical location of the user where the user is physically stayed at the connection time.

The controller 210 may display, on the virtual space 300, the connection time when the user associated with the virtual space 300 connects to the virtual space 300. The virtual space 300 may include a time band 310 as illustrated in FIG. 3. The connection time when the user connects to the virtual space 300 may be displayed in association with the time band 310.

A time band 310 of the timeline region may display a time. A main selector 311 may signify a date selected by a user currently connected to the virtual space 300. When clicking on left/right arrows of the main selector 311, the time band 310 may be moved laterally. For example, when clicking on the right arrow of the main selector 311, the time band 310 may be moved to the left. Accordingly, even though the main selector 311 maintains a current position, a time selected by the user connecting to the virtual space 300 may signify a relatively later point in time. For example, when clicking on the right arrow of the main selector 311 indicating 17:00 Apr. 14, 2009, the time band 310 may be moved to the left so that the main selector 311 indicates 18:00 Apr. 14, 2009. As for the time band 310, when desiring to perform a movement in a date unit different from a time unit, a secondary selector 312 may be used instead of the main selector 311. When clicking on a right arrow of the secondary selector 312, a list box including selectable dates may be displayed, and one of the selectable dates may be selected, and the time band 310 may be changed into the selected date.

In an indication band 320 of the timeline region, an amount of activities of the user of the virtual space 300 may be visually displayed in a corresponding time of the time band 310. For example, when the amount of activities is relatively great in the corresponding time, a large circle may be displayed, and when the amount is relatively small, a small circle may be displayed. When the amount is zero, a circle may not be displayed. When clicking on the left/right arrows of the main selector 311, the indication band 320 of the timeline region may be moved laterally together with the time band 310. Based on the above described visual displays, visitors visiting the virtual space 300 may easily ascertain times when the user of the virtual space 300 conduct activations, and select the main selector 311 to change into a time when the user significantly conduct the activations.

A location band 330 of the timeline region may display a physical location of the user at a connection time when the user of the virtual space 300 connects to the virtual space 300, in association with connection time. Referring to FIG. 3, when the user connects to the virtual space 300 at 17:00 Apr. 14, 2009, it may be found that the user stayed in London. When clicking on the left/right arrows of the main selector 311, the location band 330 of the timeline region may be moved laterally together with the time band 310. Based on the above described location display, visitors may easily ascertain a current or past physical location of the user of the virtual space 300.

In a content region 340, information about contents 341, 342, 343, and 344 uploaded by the user of the virtual space 300 may be displayed. For example, in the content region 340, image tiles associated with the uploaded contents may be displayed.

Also, the content region 340 may provide contents selected based on context information of the user associated with the virtual space 300. The context information may include a connection time when the user associated with the virtual space 300 visits the virtual space 300, a location of the user at the connection time, a current emotion determined by the user, a current status of the user determined by the user, and the like.

The content region 340 may display, on the virtual space, information about contents provided to the user in the virtual space 300 at the connection time of the user, in association with the connection time. For example, when the user connects to the virtual space 300 at 17:00 Apr. 14, 2009, to consume movie content 341, that is, when the user watches the movie content 341, the movie content 341 may be displayed in pursuant to the timeline regions 310, 320, and 330 of 17:00 Apr. 14, 2009. Similarly, when the user connects to the virtual space 300 to consume two contents 342 and 343 at 20:00 Apr. 14, 2009, the two contents 342 and 343 may be displayed in pursuant to the timeline regions 310, 320, and 330 of 20:00 Apr. 14, 2009.

Also, the content region 340 may provide information about contents selected based on the context information of the user and preference information of a visitor when the visitor visits the virtual space 300 of the user. For example, when the user connects to the virtual space 300 at 17:00 Apr. 14, 2009, to consume two contents, and only one content matches the preference information of the visitor based on a compared result between attribute information of the two contents and the preference information of the visitor, the matched content may be displayed on the content region 340. In this case, when the preference information of the visitors is different from each other even in the same virtual space, the content region 340 configured of information different for each of the visitors may be provided to the visitors.

In a content recommendation region 350, contents 351, 352, 353, 354, and 355 that are recommend to the user or the visitor may be displayed.

When the user associated with the virtual space 300 visits the virtual space 300, the controller 210 may select contents matching current status information of the user based on metadata of each of a plurality of contents stored in the content DB 222. Also, when the user visits the virtual space 300, the controller 210 may display information about the selected contents (for example, image tiles and the like of the contents) in the content recommendation region 350.

When another user (visitor) visits the virtual space 300, the controller 210 may select contents matching preference information of the visitor based on the metadata of each of the plurality of contents stored in the content DB 222. Also, when the visitor visits the virtual space 300, the controller 210 may display information about the selected contents (for example, image tiles and the like of the contents) in the content recommendation region 350.

When selecting arrows 360 and 370, a greater number of recommended contents may be displayed while the content recommendation region 350 is being moved laterally.

Figure 4:
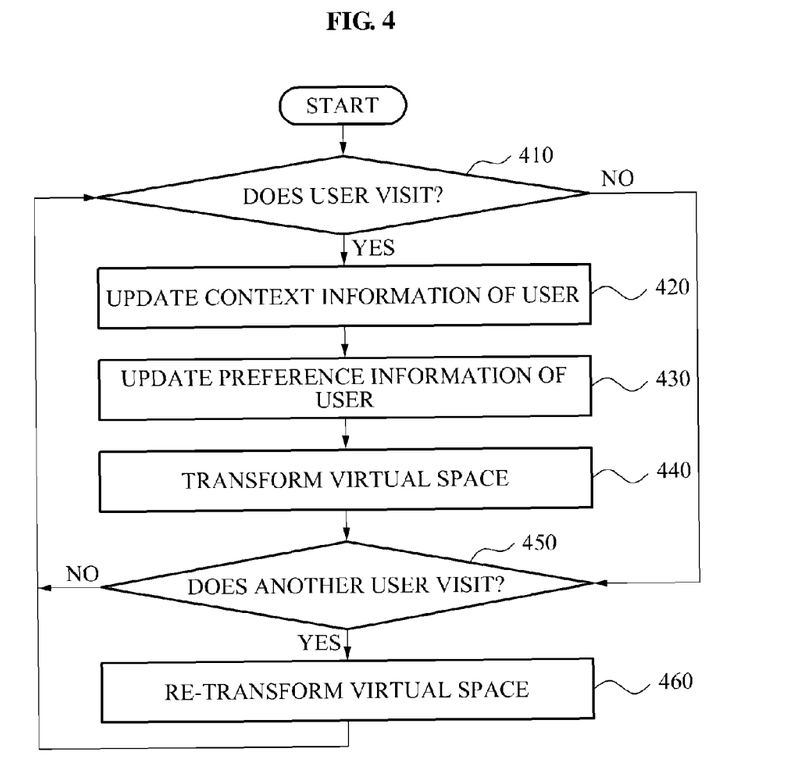
FIG. 4 is a flowchart illustrating a method for providing a virtual space associated with a user according to yet another embodiment.

FIG. 4 is a flowchart illustrating a method for providing a virtual space associated with a user according to yet another embodiment.

In operation 410, a virtual space providing server may determine whether a user associated with a virtual space visits the virtual space. When the user does not visit the virtual space based on a determined result of operation 410, the virtual space providing server may perform operation 450.

When the user visits the virtual space based on the determined result of operation 410, the virtual space providing server may perform) operation 420, and update context information of the user. The context information of the user may include a connection time when the user associated with the virtual space connects to the virtual space, a time when the user performs an action in the virtual space, a physical/virtual location of the user at the connection time, a behavior or action performed by the user in the virtual space, a current emotion of the user determined by the user, a current status of the user determined by the user, a weather of a current location of the user, information about social relationship of the user, and the like.

Next, in operation 430, the virtual space providing server may update preference information of the user. The virtual space providing server may extract the preference information from an interaction between the user and the virtual space. The extracted preference information may be stored in the user DB.

In operation 440, the virtual space providing server may transform the virtual space of the user using the context information and/or preference information of the user.

In operation 450, the virtual space providing server may determine whether another user other than the user associated with the virtual space visits the virtual space.

In operation 460, when the other user visits the virtual space based on a determine result of operation 450, the virtual space providing server may re-transform the virtual space of the user using preference information of the other user.

Figure 5:
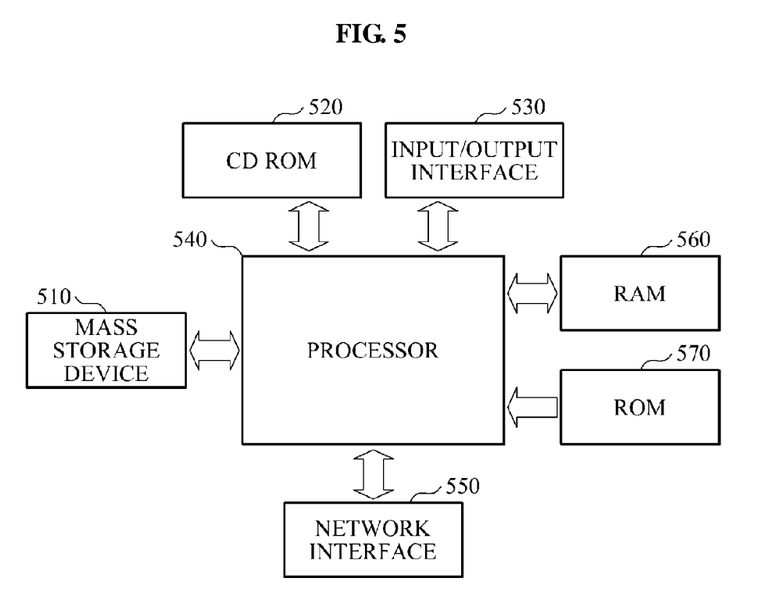
FIG. 5 is a block diagram illustrating a universal computer used in an apparatus for providing a virtual space according to further embodiment.

FIG. 5 is a block diagram illustrating a universal computer (computer system) used in an apparatus for providing a virtual space according to further embodiments.

The computer system includes any number of processors 540 (also referred to as central processing units, or CPUs) that are coupled to storage devices including primary storage 560 (typically a random access memory, or "RAM"), primary storage 570 (typically a read only memory, or "ROM"). As is well known in the art, the primary storage (e.g., ROM) 570 acts to transfer data and instructions uni-directionally to the CPU and the primary storage (e.g., RAM) 560 is used typically to transfer data and instructions in a bi-directional manner. Both of these primary storage devices may include any suitable type of the computer-readable media described above. A mass storage device 510 is also coupled bi-directionally to CPU and provides additional data storage capacity and may include any of the computer-readable media described above. The mass storage device 510 may be used to store programs, data and the like and is typically a secondary storage medium such as a hard disk that is slower than primary storage. A specific mass storage device such as a CD-ROM 520 may also pass data uni-directionally to the CPU.

Processor 540 is also coupled to an interface 530 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, processor 540 optionally may be coupled to a computer or telecommunications network using a network connection 550. With such a network connection 550, it is contemplated that the CPU may receive information from the network, or may output information to the network in the course of performing the above-described method steps. The above-described devices and materials will be familiar to those of skill in the computer hardware and software arts.

The processes, functions, methods and/or software described above including a method for providing a virtual space may be recorded, stored, or fixed in one or more computer-readable storage media that includes program instructions to be implemented by a computer to cause a processor to execute or perform the program instructions. The media may also include, alone or in combination with the program instructions, data files, data to structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for providing a virtual space associated with a user, the apparatus comprising:
   a controller configured to:
   display, on the virtual space, a timeline that comprises a time band, an indication band, and a location band;
   display, on the time band of the virtual space, a connection time when a user initially connects to the virtual space for a communication session;
   display, on the location band of the virtual space, the physical location of the user at the connection time in association with the connection time;
   display, on the indication band of the virtual space, an amount of the activities of the user of the virtual space in a corresponding time of the time band; and
   display, on the virtual space, information about contents in association with the connection period of the communication session, the contents being provided to the user in the virtual space during the connection period of the communication session, wherein:
   the virtual space is a personal homepage of the user, a blog page of the user, or a profile page associated with the user in a social network service.

2. An apparatus for providing a virtual space associated with a user, the apparatus comprising:
   a storage configured to store context information of the user of the virtual space; and
   a controller configured to provide, to another user, the virtual space transformed based on the context information of the user when the other user visits the virtual space of the user, wherein:
   the controller selects a content item for display, from among a plurality of content items, based upon the context information and transforms the virtual space by displaying the selected item in the virtual space,
   the virtual space is a personal homepage of the user, a blog page of the user, or a profile page associated with the user in a social network service,
   the context information comprises at least one of: a connection time when the user initially connects to the virtual space for a communication session, a location of the user during the connection time, a current emotion of the user as determined by the user, and a current status of the user as determined by the user, and
   the virtual space displays a timeline that comprises a time band, an indication band and a location band, the time band displays a connection time when a user initially connects to the virtual space for a communication session, the indication band displays an amount of activities of the user of the virtual space in a corresponding time of the time band, and the location band displays a physical location of the user at the connection time in association with the connection time.

3. The apparatus of claim 2, wherein the controller is further configured to provide, to the other user, the virtual space transformed based on the context information of the user and preference information of the other user when the other user visits the virtual space of the user.

4. The apparatus of claim 3, wherein the preference information comprises at least one of:
   information about a consumption frequency of contents consumed by the other user; and
   wish list information about contents desired to be consumed by the other user, the wish list information being inputted by the other user.

5. The apparatus of claim 2, wherein the controller is further configured to:
   select contents matching the context information based on metadata of each of a plurality of contents; and
   provide, to the user, information about the selected contents when the user visits the virtual space.

6. The apparatus of claim 2, wherein:
   the storage is further configured to store preference information extracted from an interaction between the user and the virtual space for a predetermined past period of time, and
   the controller is further configured to:
   select contents corresponding to the preference information referring to metadata of each of a plurality of contents; and
   provide, to the user, information about the selected contents when the user visits the virtual space.

7. An apparatus for providing a virtual space associated with a user, the apparatus comprising:
   a storage configured to store:
   first information associated with the user of the virtual space; and
   second information associated with and unique to each of other users; and
   a controller configured to:
   generate the virtual space based on the first information of the user and customize the virtual space when the other users visit the virtual space of the user by transforming, for each of the other users, the virtual space based solely on the second information associated with and unique to the other user; and
   provide, to each of the other users, the virtual space customized for the other user, wherein:
   the virtual space is a personal homepage of the user, a blog page of the user, or a profile page associated with the user in a social network service, and
   the virtual space displays a timeline that comprises a time band, an indication band and a location band, the time band displays a connection time when a user initially connects to the virtual space for a communication session, the indication band displays an amount of activities of the user of the virtual space in a corresponding time of the time band, and the location band displays a physical location of the user at the connection time in association with the connection time.

8. The apparatus of claim 7, wherein the second information is preference information of the particular other user.

9. A method of providing a virtual space associated with a user, the method comprising:
   displaying, on the virtual space, a timeline that comprises a time band, an indication band, and a location band;

displaying, on the time band of the virtual space, a connection time when a user initially connects to the virtual space for a communication session;

displaying, on the location band of the virtual space, the physical location of the user at the connection time in association with the connection time;

displaying, on the indication band of the virtual space, an amount of the activities of the user of the virtual space in a corresponding time of the time band; and displaying, on the virtual space, information about contents in association with the connection period of the communication session, the contents being provided to the user in the virtual space during the connection period of the communication session, wherein:

the virtual space is a personal homepage of the user, a blog page of the user, or a profile page associated with the user in a social network service.

10. A method of providing a virtual space associated with a user, the method comprising:

storing context information of the user of the virtual space;

selecting a content item for display, from among a plurality of content items, based upon the context information of the user; and providing, to another user, the virtual space transformed based on the context information of the user when the other user visits the virtual space of the user, wherein:

the virtual space is transformed by displaying the selected item in the virtual space, the virtual space is a personal homepage of the user, a blog page of the user, or a profile page associated with the user in a social network service, the context information comprises at least one of: a connection time when the user initially connects to the virtual space for a communication session, a location of the user during the connection time, a current emotion of the user as determined by the user, and a current status of the user as determined by the user, and the virtual space displays a timeline that comprises a time band, an indication band and a location band, the time band displays a connection time when a user initially connects to the virtual space for a communication session, the indication band displays an amount of activities of the user of the virtual space in a corresponding time of the time band, and the location band displays a physical location of the user at the connection time in association with the connection time.

11. The method of claim 10, further comprising providing, to the other user, the virtual space transformed based on the context information of the user and preference information of the other user when the other user visits the virtual space of the user.

12. The method of claim 11, wherein the preference information comprises at least one of:

information about a consumption frequency of contents consumed by the other user; and wish list information about contents desired to be consumed by the other user, the wish list information being inputted by the other user.

13. The method of claim 10, further comprising:

selecting contents matching the context information based on metadata of each of a plurality of contents; and providing, to the user, information about the selected contents when the user visits the virtual space.

14. The method of claim 10, further comprising:

storing preference information extracted from an interaction between the user and the virtual space for a predetermined past period of time;

selecting contents corresponding to the preference information referring to metadata of each of a plurality of contents; and providing, to the user, information about the selected contents when the user visits the virtual space.

15. A method for providing a virtual space associated with a user, the method comprising:

storing:

first information associated with the user of the virtual space; and second information associated with and unique to each of other users;

generating the virtual space based on the first information of the user and customizing the virtual space when the other users visit the virtual space of the user by transforming, for each of the other users, the virtual space based solely on the second information associated with and unique to the other user; and providing, to each of the other users, the virtual space customized for the other user, wherein:

the virtual space is a personal homepage of the user, a blog page of the user, or a profile page associated with the user in a social network service, and the virtual space displays a timeline that comprises a time band, an indication band and a location band, the time band displays a connection time when a user initially connects to the virtual space for a communication session, the indication band displays an amount of activities of the user of the virtual space in a corresponding time of the time band, and the location band displays a physical location of the user at the connection time in association with the connection time.

16. The method of claim 15, wherein the second information is preference information of the particular other user.

* * * * *